US012329063B2

(12) United States Patent
Colber, Jr. et al.

(10) Patent No.: US 12,329,063 B2
(45) Date of Patent: Jun. 17, 2025

(54) HANDLE ASSEMBLY FOR A POWER TOOL

(71) Applicant: TECHTRONIC CORDLESS GP, Anderson, SC (US)

(72) Inventors: William E. Colber, Jr., Lavonia, GA (US); Joel Harbin, Anderson, SC (US); Ronald J. Hoffman, Iva, SC (US); Christopher Holman, Clemson, SC (US); Jordan Craven, Simpsonville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 1117 days.

(21) Appl. No.: 17/174,954

(22) Filed: Feb. 12, 2021

(65) Prior Publication Data

US 2022/0256767 A1 Aug. 18, 2022

(51) Int. Cl.
  *A01D 34/82* (2006.01)
  *A01D 34/68* (2006.01)
  *A01D 101/00* (2006.01)

(52) U.S. Cl.
  CPC ........... *A01D 34/824* (2013.01); *A01D 34/68* (2013.01); *A01D 2034/6843* (2013.01); *A01D 2101/00* (2013.01)

(58) Field of Classification Search
  CPC ...... A01D 34/67; A01D 34/001; A01D 34/68; A01D 34/81; A01D 34/82; A01D 34/824; A01D 2101/00; A01D 2034/6842
  See application file for complete search history.

(56) References Cited

U.S. PATENT DOCUMENTS 2,786,694 A  3/1957  Gray
2,957,295 A  10/1960  Brown
(Continued)

FOREIGN PATENT DOCUMENTS

CN       2381113 Y    6/2000
CN     201518585 U    7/2010
(Continued)

OTHER PUBLICATIONS

European Search Report Corresponding with Application No. EP22152877 on Sep. 16, 2022 (2 pages).
(Continued)

*Primary Examiner* — Adam J Behrens
(74) *Attorney, Agent, or Firm* — Dority & Manning, P.A.

(57) ABSTRACT

A handle assembly can include a handle extending from a work portion of the power tool. The handle can include a handle member configured to be engaged by a user when operating the power tool and at least one elongated member extending between the work portion of the power tool and the handle member. A multi-position interface can be spaced apart from the handle member and define a plurality of engagement interfaces. An engagement element can be configured to move relative to the multi-position interface and be selectively engageable with the plurality of engagement interfaces. A user engageable interface can be configured to selectively move the engagement element into and out of engagement with the plurality of engagement interfaces. The handle assembly can be angularly repositionable between a plurality of angular orientations when the engagement element is not disposed within any of the plurality of engagement interfaces.

20 Claims, 4 Drawing Sheets

(56) References Cited

U.S. PATENT DOCUMENTS

| | | | |
|---|---|---|---|
| 2,966,365 A | 12/1960 | Kortum | |
| 3,145,519 A | 8/1964 | Pearson | |
| 3,481,123 A | 12/1969 | Lessig | |
| 3,593,505 A | 7/1971 | Mittelstadt | |
| 3,618,304 A | 11/1971 | Hundhausen | |
| 3,694,855 A | 10/1972 | Meyer | |
| 4,361,001 A | 11/1982 | Almond | |
| 4,392,538 A * | 7/1983 | Goertzen | B62D 51/001 |
| | | | 403/322.3 |
| 4,706,446 A | 11/1987 | Doi | |
| 4,916,887 A | 4/1990 | Mullet | |
| 4,944,142 A | 7/1990 | Sueshige | |
| 5,109,656 A | 5/1992 | Zimmer | |
| 5,163,275 A | 11/1992 | Hare | |
| 5,259,176 A | 11/1993 | Kahamura | |
| 5,407,400 A | 4/1995 | Thomas | |
| 5,809,765 A | 9/1998 | Hastings | |
| 5,890,354 A | 4/1999 | Bednar | |
| 5,894,717 A | 4/1999 | Yamashita | |
| 5,960,619 A | 10/1999 | Seidel | |
| 6,449,933 B1 | 4/2002 | Umemoto | |
| 6,625,966 B2 | 9/2003 | Kaneyuki | |
| 7,090,045 B2 | 8/2006 | Okada | |
| 7,231,755 B2 | 6/2007 | Clarke | |
| 7,347,434 B2 | 3/2008 | Lewis | |
| 7,392,643 B2 | 7/2008 | Warashina | |
| 7,677,344 B2 | 3/2010 | Medina | |
| 7,802,417 B2 | 9/2010 | Sauerwein | |
| 8,256,198 B2 | 9/2012 | Thompson | |
| 8,875,833 B2 | 7/2014 | Kouma | |
| 9,021,777 B2 | 5/2015 | Johnson | |
| 9,038,356 B2 | 5/2015 | Shao | |
| D755,858 S | 5/2016 | Brown | |
| 9,386,743 B2 | 7/2016 | Baker | |
| 9,439,352 B2 | 9/2016 | Arvidsson | |
| 9,462,747 B2 | 10/2016 | Schmalz | |
| 9,480,200 B1 | 11/2016 | Patridge | |
| 9,491,907 B2 | 11/2016 | Edholm | |
| 9,677,648 B2 | 6/2017 | Wadzinski | |
| 9,848,531 B2 * | 12/2017 | Wadzinski | A01D 34/001 |
| 10,070,579 B2 | 9/2018 | Kuriyagawa | |
| 10,070,584 B2 | 9/2018 | Kuriyagawa | |
| 10,080,327 B2 | 9/2018 | Helgesen | |
| 10,091,931 B2 | 10/2018 | Yoshimura | |
| 10,123,478 B2 | 11/2018 | Shaffer et al. | |
| 10,188,032 B2 | 1/2019 | Ito | |
| 10,285,328 B2 | 5/2019 | Kurioka | |
| 10,306,831 B2 | 6/2019 | Porter | |
| 10,433,478 B2 | 10/2019 | Smith | |
| 10,485,167 B2 | 11/2019 | Smith | |
| 10,624,262 B2 | 4/2020 | Bejcek | |
| 10,856,468 B2 * | 12/2020 | Legan | A01D 34/67 |
| 10,940,750 B2 | 3/2021 | Pan | |
| 11,122,737 B2 | 5/2021 | Xu | |
| 11,246,260 B2 | 2/2022 | Xu | |
| 2002/0069631 A1 | 6/2002 | Dyke | |
| 2002/0189137 A1 | 12/2002 | Cox | |
| 2003/0182919 A1 | 10/2003 | Baumann | |
| 2011/0036065 A1 | 2/2011 | Wong | |
| 2011/0173941 A1 | 7/2011 | Persson | |
| 2013/0046448 A1 | 2/2013 | Fan | |
| 2013/0111867 A1 * | 5/2013 | Schmalz | A01D 34/82 |
| | | | 123/196 R |
| 2014/0260157 A1 * | 9/2014 | Baker | A01D 34/71 |
| | | | 56/16.6 |
| 2014/0331809 A1 * | 11/2014 | Mikula | A01D 34/824 |
| | | | 74/491 |
| 2016/0201771 A1 | 7/2016 | Wadzinski et al. | |
| 2017/0202138 A1 | 7/2017 | Pellenc | |
| 2017/0367265 A1 | 12/2017 | Wadzinski et al. | |
| 2018/0368316 A1 | 12/2018 | Shaffer et al. | |
| 2019/0045707 A1 | 2/2019 | Patridge | |
| 2019/0133036 A1 * | 5/2019 | Legan | A01D 34/824 |
| 2019/0183041 A1 | 6/2019 | Nonaka | |
| 2019/0307063 A1 | 10/2019 | Hong | |
| 2020/0000030 A1 * | 1/2020 | Wei | A01D 75/18 |
| 2020/0100426 A1 | 4/2020 | Kurihara | |
| 2020/0164741 A1 | 5/2020 | Tsuji | |
| 2020/0215906 A1 | 7/2020 | Shimazaki | |
| 2020/0375102 A1 | 12/2020 | Arendt et al. | |
| 2021/0015038 A1 * | 1/2021 | Yamaoka | A01D 34/824 |
| 2021/0016817 A1 * | 1/2021 | Zhu | A01D 34/68 |
| 2021/0112712 A1 | 4/2021 | Vaughn | |
| 2022/0124976 A1 | 4/2022 | Xu | |
| 2022/0287228 A1 * | 9/2022 | Driscoll | A01D 34/001 |
| 2024/0049631 A1 * | 2/2024 | Porter | A01D 34/68 |

FOREIGN PATENT DOCUMENTS

| | | | |
|---|---|---|---|
| CN | 101836540 A | 9/2010 | |
| CN | 202172591 U | 3/2012 | |
| CN | 103283375 A | 9/2013 | |
| CN | 103283380 A | 9/2013 | |
| CN | 203344655 U | 12/2013 | |
| CN | 203407205 U | 1/2014 | |
| CN | 203407212 U | 1/2014 | |
| CN | 103843516 A | 6/2014 | |
| CN | 203723096 U | 7/2014 | |
| CN | 203851475 U | 10/2014 | |
| CN | 203951828 | 11/2014 | |
| CN | 203984888 U | 12/2014 | |
| CN | 104334008 A | 2/2015 | |
| CN | 104686083 B | 6/2015 | |
| CN | 204362533 U | 6/2015 | |
| CN | 104919967 B | 9/2015 | |
| CN | 204976318 U | 1/2016 | |
| CN | 205207090 U | 5/2016 | |
| CN | 106042916 A | 10/2016 | |
| CN | 206260310 U | 6/2017 | |
| CN | 206690874 U | 12/2017 | |
| CN | 206808087 U | 12/2017 | |
| CN | 207235370 U | 4/2018 | |
| CN | 207269314 U | 4/2018 | |
| CN | 207589549 U | 7/2018 | |
| CN | 108450122 A | 8/2018 | |
| CN | 108834443 A | 11/2018 | |
| CN | 208113339 U | 11/2018 | |
| CN | 109392415 A | 3/2019 | |
| CN | 109496564 A | 3/2019 | |
| CN | 209170911 U | 7/2019 | |
| CN | 209299732 U | 8/2019 | |
| CN | 110636754 A | 12/2019 | |
| CN | 210093998 U | 2/2020 | |
| CN | 210491696 U | 5/2020 | |
| CN | 111328557 A | 6/2020 | |
| CN | 210694954 U | 6/2020 | |
| CN | 111492805 A | 8/2020 | |
| CN | 212573551 U | 2/2021 | |
| CN | 212643450 U | 3/2021 | |
| DE | 102017205320 A1 * | 10/2018 | A01D 34/824 |
| DE | 102018216089 A1 | 3/2020 | |
| EP | 0014385 B1 | 8/1980 | |
| EP | 481655 B1 | 4/1992 | |
| EP | 0510882 A1 | 10/1992 | |
| EP | 0937379 B1 | 8/1999 | |
| EP | 1752036 B1 | 7/2008 | |
| EP | 2170032 B1 | 4/2010 | |
| EP | 3334270 B1 | 6/2018 | |
| FR | 2914141 B1 | 10/2008 | |
| JP | 2002119114 A | 4/2002 | |
| JP | 2014128218 A | 7/2014 | |

OTHER PUBLICATIONS

European Search Report Corresponding with Application No. EP22191391 on Jan. 12, 2023 (2 pages).

Chinese Office Action Corresponding with Application No. 202210133173.5 on Apr. 14, 2023 (2 pages).

\* cited by examiner

HANDLE ASSEMBLY FOR A POWER TOOL

FIELD

The present disclosure relates generally to power tools, and more particularly to adjustable handle assemblies for power tools.

BACKGROUND

Power tools are increasingly utilized to facilitate operations that would be traditionally left to manual labor. In particular, powered lawn mowers have replaced hand push mowers. Powered lawn mowers generally include a work portion having a rotating blade or wire which operates at high speeds to cut grass. A handle extends from the work portion and allows an operator to push or guide the lawn mower across the grass.

Original powered lawn mowers utilized fixed length handles. More recent lawn mowers have utilized telescopic handles which allow a user to adjust a height of the handle. However, telescopic adjustments are prone to break and do not account for various angular positions of the handle that a particular operator may desire.

Accordingly, improved handle assemblies for power tools, and more particularly lawn mowers, are desired in the art. In particular, handle assemblies which provide greater degrees of adjustability without compromising on strength would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a handle assembly for a power tool is provided. The handle assembly includes a handle extending from a work portion of the power tool, the handle comprising: a handle member configured to be engaged by a user when operating the power tool; and at least one elongated member extending between the work portion of the power tool and the handle member; a multi-position interface spaced apart from the handle member, the multi-position interface defining a plurality of engagement interfaces; an engagement element configured to move relative to the multi-position interface and be selectively engageable with the plurality of engagement interfaces; and a user engageable interface disposed at or adjacent to the handle member and configured to selectively move the engagement element into and out of engagement with the plurality of engagement interfaces of the multi-position interface, wherein the handle assembly is angularly repositionable between a plurality of angular orientations when the engagement element is not disposed within any of the plurality of engagement interfaces, and wherein the handle assembly is angularly fixed to the work portion of the power tool when the engagement element is disposed within one or more of the plurality of engagement interface In accordance with another embodiment, a handle assembly is provided. The handle assembly includes a multi-position interface coupled to a work portion of the power tool; a user engageable interface coupled to a handle of the power tool; and an engagement element coupled to the user engageable interface and selectively adjustable between a plurality of slots disposed in the multi-position interface, the engagement element being spring biased into the slots and linearly displaceable from the slots upon actuation of the user engageable interface.

In accordance with another embodiment, a method of adjusting a handle assembly is provided. The method includes actuating a user engageable interface so as to move an engagement element relative to a first engagement interface of a multi-position interface; adjusting the angular orientation of the handle assembly after the engagement element is clear of the first engagement interface; and actuating the user engageable interface so as to move the engagement element to the multi-position interface at a second engagement interface of the multi-position interface.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, adjustable handle assemblies as described in accordance with embodiments herein may allow an operator to actuate a user engageable interface disposed at or adjacent to a handle member of a power tool for purpose of moving an engagement element from a first engagement interface to a second engagement interface. The first and second engagement interfaces can be offset from one another in a rotational direction, a linearly translatable direction, or both. By moving the engagement element between the first and second engagement interfaces, the user can reposition the handle at different relative positions, e.g., at different angular orientations. In such a manner, the operator can select a desirable operational position of the handle. A biasing element, such as a spring, can bias the engagement element into the engagement interface such that the engagement element stays engaged therewith until the user again actuates the user engageable interface. In a particular embodiment, actuation of the user engagement interface can cause the engagement element to displace in a linear manner.

Figure 1:
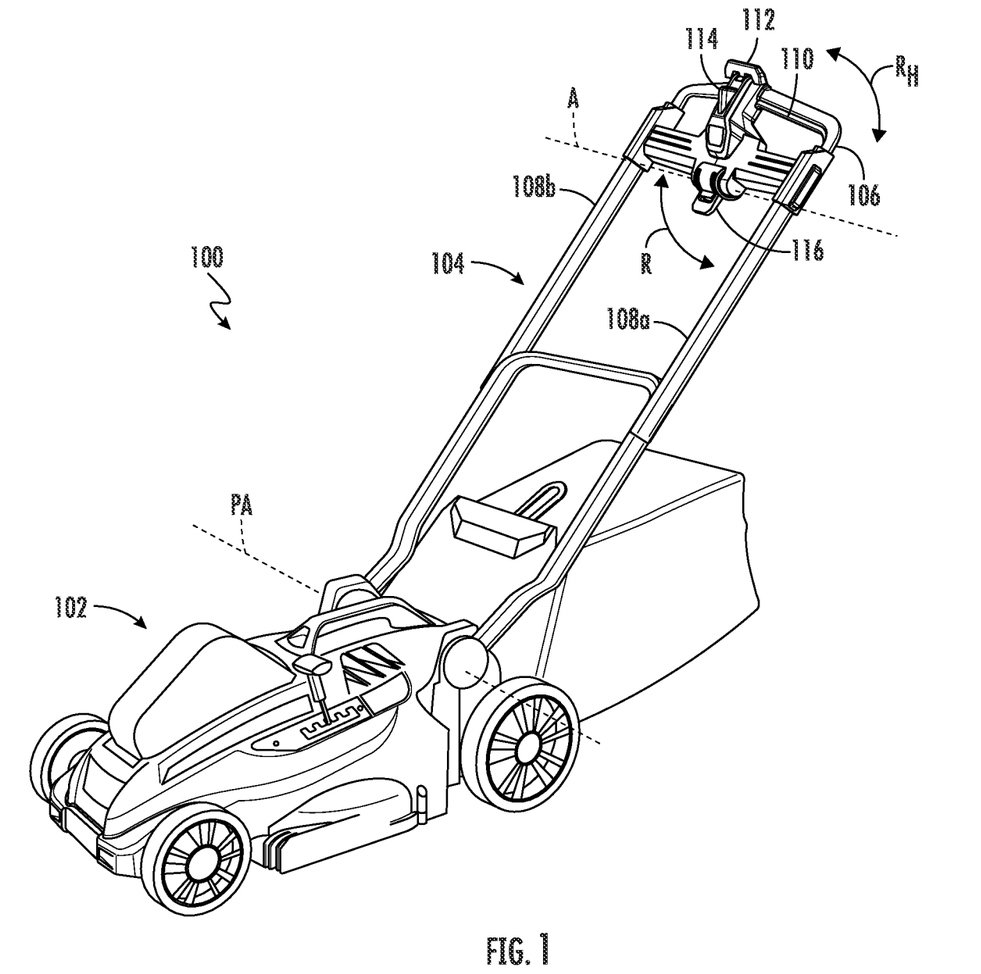
FIG. 1 is a perspective view of a power tool in accordance with an exemplary embodiment of the present disclosure.

Referring now to the drawings, FIG. 1 illustrates a power tool, and more particularly a lawn mower 100, in accordance with an exemplary embodiment of the present disclosure. The lawn mower 100 can be a manual push mower, a motorized push mower, or another type of lawn mower. The lawn mower 100 generally includes a work portion 102 and a handle 104 extending from the work portion 102. The handle 104 includes a handle member 106 corresponding with an area configured to be engaged by a user when operating the power tool. The handle 104 further includes elongated members 108A and 108B extending between the work portion 102 and the handle member 106. Disposed on the handle member 106 of the exemplary embodiment is a kill switch 110 and a speed control element 112. While depressing the kill switch 110, the operator can operate the lawn mower 100 by adjusting the speed control element 112. A power switch 114 can include be included on the handle member 106. Other arrangements, engagement mechanisms, and the like can be used in place of the kill switch, speed control element 112, power switch 114, or a combination thereof. The particular arrangement of control features illustrated in FIG. 1 is provided by way of example.

Figure 2:
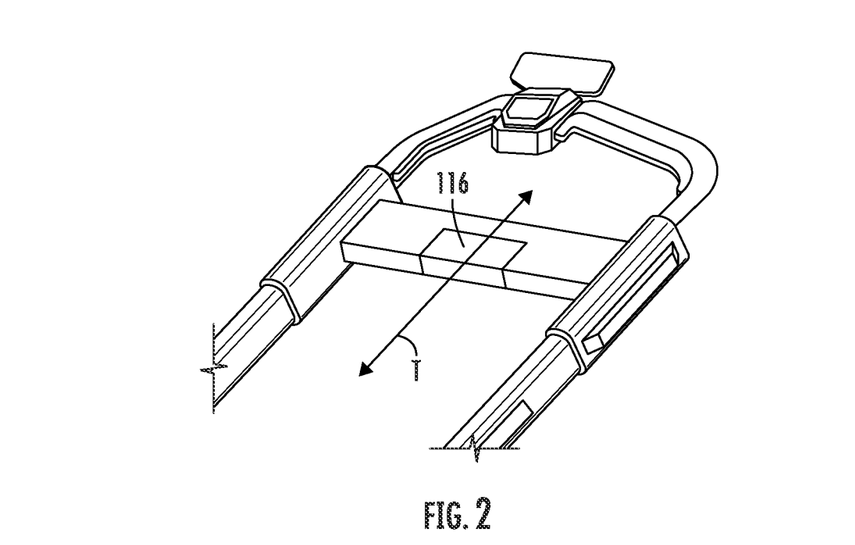
FIG. 2 is an enlarged view of a handle portion of the power tool in accordance with an exemplary embodiment of the present disclosure.

The lawn mower 100 can further include a user engageable interface (UEI) 116. The UEI 116 can be disposed on the handle 104, such as at (or adjacent to) the handle member 106. In the embodiment illustrated in FIG. 1, the UEI 116 includes a rotatable element configured to rotate in a rotational direction R about an axis A. In another embodiment, illustrated for example in FIG. 2, the UEI 116 includes a translatable element configured to translate T in a generally linear direction. In yet another embodiment, the UEI 116 can be configured to operate in a different direction or orientation of displacement.

In embodiments described herein, the handle 104 depicted in FIG. 1 can be reconfigurable between two or more positions. For instance, the handle 104 can be rotated between two or more rotational orientations, as measured with respect to the work portion 102 of the lawn mower 100. In an embodiment, rotation RH of the handle 104 can occur about a pivot axis PA disposed proximate to the work portion 102 of the lawn mower 100. In an embodiment, the pivot axis PA can extend horizontally across the lawn mower 100 in a direction generally perpendicular to a direction of travel. In other embodiments, the pivot axis PA can be angularly offset from the perpendicular direction.

The handle 104 can be configured to rotate RH about the pivot axis PA at least 1°, such as at least 5°, such as at least 10°, such as at least 15°, such as at least 20°, such as at least 25°, such as at least 30°, such as at least 35°, such as at least 40°, such as at least 45°. In an embodiment, the handle 104 can rotate to a collapsed position, e.g., for storage. In the collapsed position, the handle 104 may be freely rotatable, i.e., not fixedly retained in the collapsed position, or fixed, i.e., fixedly retained in the collapsed position, e.g., in a manner as described herein.

To reconfigure the handle 104, the user can actuate the UEI 116 between a first position and a second position. The first position can correspond with a fixed arrangement between the handle 104 and the work portion 102. The second position can correspond with an adjustable arrangement between the handle 104 and the work portion 102. In the second position, the handle 104 can be moved by the operator within a range of displacement—e.g., rotational displacement, linear displacement, or both. The handle 104 and work portion 102 can again become fixed relative to one another when the UEI 116 returns to the first position. However, when locking the displaced handle 104 relative to the work portion 102, the arrangement of a locking mechanism of the lawn mower 100 can be different, as described below.

Figure 3:
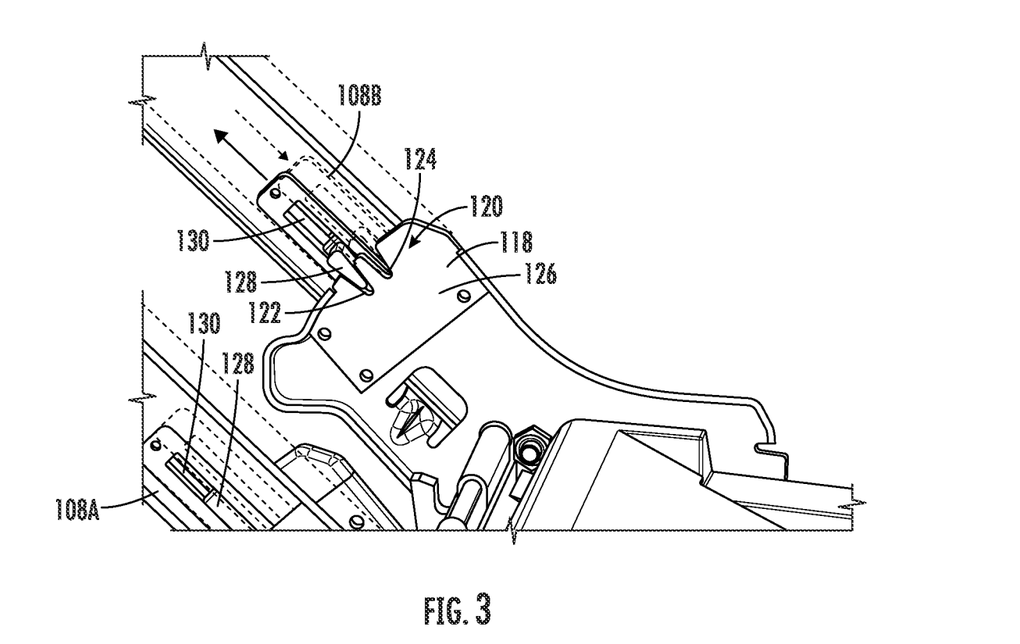
FIG. 3 is an enlarged view of a locking mechanism of the power tool in accordance with an exemplary embodiment of the present disclosure.

Referring to FIG. 3, the locking mechanism can generally include a multi-position interface 118 defining a plurality of engagement interfaces 120, such as a first engagement interface 122 and a second engagement interface 124. The plurality of interfaces 120 can include, for example, at least two interfaces, such as at least three interfaces, such as at least four interfaces, such as at least five interfaces. In an embodiment, the interfaces 120 can be spaced apart from one another, i.e., offset, by the same, or similar, distances. In another embodiment, at least one pair of adjacent interfaces 120 can be offset by a different distance than another pair of adjacent interfaces 120.

In an embodiment, the first and second engagement interfaces 122 and 124 can each include a slot extending into a body 126 of the multi-position interface 118. The multi-position interface 118 can be spaced apart from the handle member 106. In an embodiment, the multi-position interface 118 can be coupled to the work portion 102 of the lawn mower 100. The first and second engagement interfaces 122 and 124 can be oriented to have open ends facing in a direction generally toward the handle member 106.

The locking mechanism can further include an engagement element 128 configured to selectively engage with the multi-position interface 118, e.g., at the first and second engagement interfaces 122 and 124. In an embodiment, the engagement element 128 can have a shape configured to form a close-fit with the engagement interfaces 120. For example, in the illustrated embodiment, the engagement element 128 has a generally wedge shape which fits within a generally wedge-shaped slot of the multi-position interface 118.

The engagement element 128 can be operatively coupled to the UEI 116 such that actuation of the UEI 116 displaces the engagement element 128 relative to the engagement interfaces 120. The solid arrow shows the direction of travel of the engagement element 128 when the UEI 116 is displaced in accordance with an embodiment. The dashed arrow shows the direction of travel of the engagement element 128 when the UEI 116 returns to its original position. Dashed lines shown in FIG. 3 reference the engagement element 128 and handle 104 when the engagement element is in the second engagement interface 124 corresponding with a different orientation of the handle 104.

In an embodiment, the engagement element 128 can be coupled to the UEI 116 through one or more connective members 130. In a particular embodiment, at least one of the connective members 130 can extend within one of the elongated members 108A or 108B.

Figure 4:
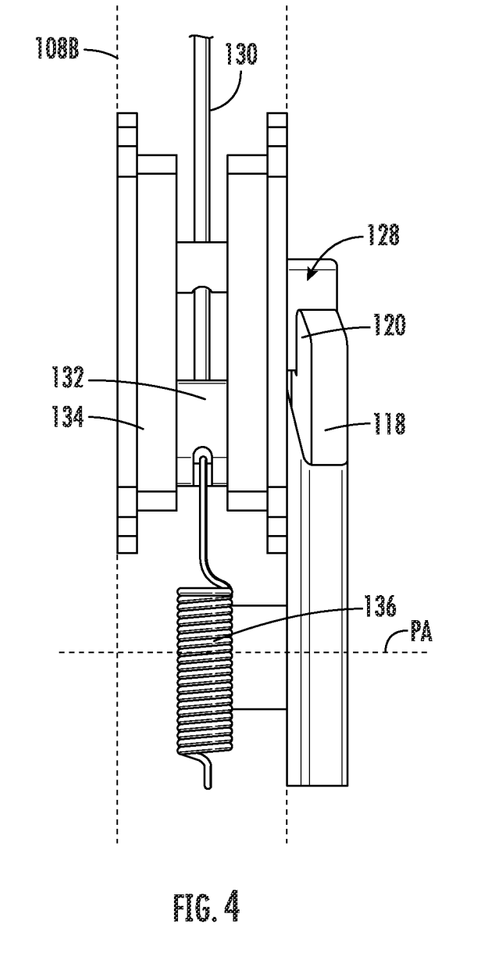
FIG. 4 is an enlarged view of a locking mechanism of the power tool in accordance with an exemplary embodiment of the present disclosure.

Referring to FIG. 4, in certain embodiments the engagement element 128 and corresponding connective member 130 can be interposed by a link 132. In the illustrated embodiment, the link 132 is integral with the engagement element 128. However, in other embodiments, the link 132 can include a discrete element configured to attach the engagement element 128 and connective member 130 together. The link 132, connective member 130, engagement element 128, or a combination thereof may be configured to move within a guide 134. The guide 134 can define a pathway for translation of the engagement element 128 to and from the engagement interfaces 120 of the multi-position interface 118.

When the user actuates the UEI 116, the connective member 130 can pull the link 132 which translates the engagement element 128 from the engagement interfaces 120. The handle 104 can then be rotated between a plurality of different positions. In the embodiment illustrated in FIG. 4, rotation can occur about the pivot axis PA resulting in the handle 104 rotating into and out of the page. A biasing element 136 can bias the engagement element 128 into the engagement interfaces 120. The biasing element 136 can include, for example, a spring. In a particular embodiment, the spring can extend between the link 132 or engagement element 128 and pull the engagement element 128 toward the work portion 102. In certain instances, the spring can have a suitable spring rate to pull the engagement element 128 into the engagement interfaces when the UEI 116 is released. That is, the spring rate of the spring can be configured to automatically bias the engagement element 128 into the engagement interface when no force is applied by the operator on the UEI 116. In further instances, the spring can assist the user in rotating the UEI 116 to the first position whereby the engagement element 128 is disposed in one or more of the engagement interfaces 120.

Figure 5:
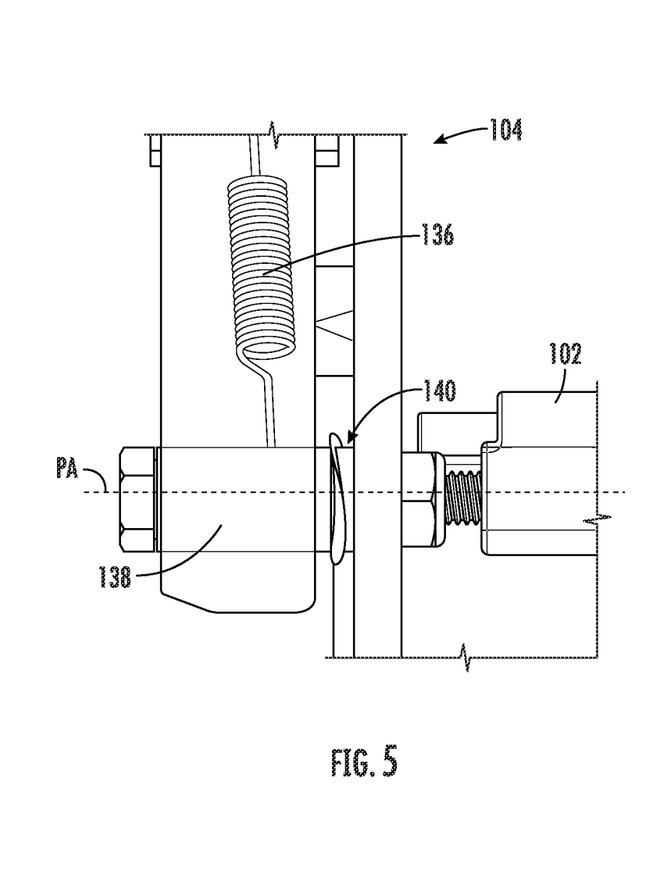
FIG. 5 is an enlarged view of a locking mechanism of the power tool in accordance with an exemplary embodiment of the present disclosure.

In an embodiment, the biasing element 136 can pass over the pivot axis PA, such as illustrated in FIG. 4. That is, an upper portion of the biasing element 136 can be disposed on a first side of the pivot axis PA and a lower portion of the biasing element 136 can be disposed on a second side of the pivot axis PA. In another embodiment, the biasing element 136 can be coupled to a member located at the pivot axis PA. That is, the biasing element 136 may not extend past, or may not extend substantially past, the pivot axis PA. For instance, referring to FIG. 5, in an embodiment, the biasing element 136 can be coupled with a rotatable interface, e.g., a bushing 138, about which the pivot axis PA is disposed. By way of nonlimiting example, the rotatable interface can include the bushing 138 disposed on a pivot shaft 140. The pivot shaft 140 can be fixedly coupled to the work portion 102 of the lawn mower 100. The bushing 138 can be fixedly coupled to the handle 104. In a particular instance, adjusting the handle 104 can cause the bushing 138 and handle 104 to rotate together about the pivot axis PA defined by the pivot shaft 140.

Referring again to FIG. 1, in an embodiment the above-described locking mechanism can be included on both elongated members 108A and 108B. That is, the handle 104 and work portion 102 can be selectively secured together at fixed positions through both of the elongated members 108A and 108B. In another embodiment, only one of the elongated members 108A or 108B has a locking mechanism and the other of the elongated members 108A or 108B does not include the described locking mechanism. For instance, the other of the elongated members 108A or 108B may be free to move independent of the position of the UEI 116.

Figure 6:
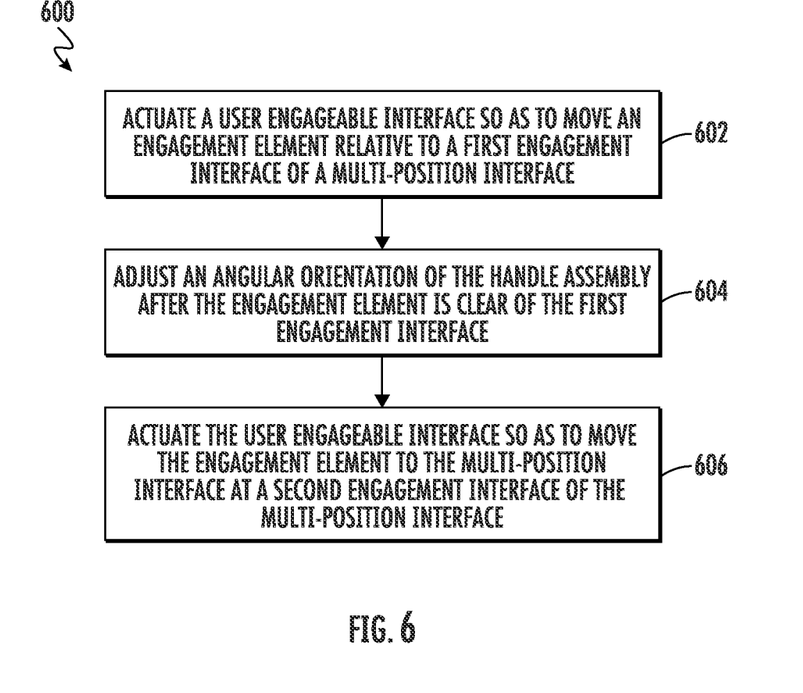
FIG. 6 is a flow chart of a method of adjusting a handle assembly of a power tool in accordance with an exemplary embodiment of the present disclosure.

FIG. 6 illustrates a flow chart of a method 600 of adjusting a handle assembly of a power tool. The method 600 includes a step 602 of actuating a user engageable interface so as to move an engagement element relative to a first engagement interface of a multi-position interface. The step 602 may be performed by rotating the user engageable interface, translating the user engageable interface in a linear direction, or through a combination thereof. The step 602 may require the operator to release a lock or other mechanism configured to prevent accidental movement of the user engageable interface. In certain instances, step 602 may be performed while the power tool is in the on position, the off position, static, moving, or at any other time during operation of the power tool. By actuating the user engageable interface, the operator may cause a biasing element, e.g., the aforementioned spring, to elongate, creating force to return the user engageable interface to the original position.

The method 600 can further include a step 604 of adjusting the angular orientation of the handle assembly after the engagement element is clear of the first engagement interface. That is, the operator can reposition the handle assembly after completion, or substantial completion, of step 602. As described herein, adjustment may occur by rotating the handle about a pivot axis. The operator may rotate the handle to the desired position at step 604. In certain instances, the operator may maintain the user engageable interface in an actuated position during step 604. In other instances, the operator may be able to release the user engageable interface during step 604. That is, the user engageable interface may be configured to remain in the unlocked position to permit adjustment of the handle without requiring the operator maintain the user engageable interface in the unlocked position.

The method 600 can further include a step 606 of actuating the user engageable interface so as to move the engagement element to the multi-position interface at a second engagement interface thereof. The step 606 can be performed by positively moving the user engageable interface or releasing the user engageable interface such that it returns automatically to the locked position. The step 606 can be performed after the operator has selected an appropriate position of the handle.

Steps 602 or 606 can cause one or more connective members extending between the user engageable interface to move the engagement element relative to the multi-position interface, causing the engagement element to seat or pull therefrom. In an embodiment, movement of the engagement element can occur in a linear direction. Step 602 can cause the engagement element to linearly translate in a first direction while step 606 can cause the engagement element to linearly translate in a second direction opposite, or generally opposite, the first direction.

While the embodiments described herein are directed to lawn mowers in particular, it should be understood that the invention may be applicable to other types of tools with handles, and power tools with handles more particularly.

Further aspects of the invention are provided by one or more of the following embodiments:

Embodiment 1. A handle assembly for a power tool, the handle assembly comprising: a handle extending from a work portion of the power tool, the handle comprising: a handle member configured to be engaged by a user when operating the power tool; and at least one elongated member extending between the work portion of the power tool and the handle member; a multi-position interface spaced apart from the handle member, the multi-position interface defining a plurality of engagement interfaces; an engagement element configured to move relative to the multi-position interface and be selectively engageable with the plurality of engagement interfaces; and a user engageable interface disposed at or adjacent to the handle member and configured to selectively move the engagement element into and out of engagement with the plurality of engagement interfaces of the multi-position interface, wherein the handle assembly is angularly repositionable between a plurality of angular orientations when the engagement element is not disposed within any of the plurality of engagement interfaces, and wherein the handle assembly is angularly fixed to the work portion of the power tool when the engagement element is disposed within one or more of the plurality of engagement interfaces.

Embodiment 2. The handle assembly of any one or more of the embodiments, wherein the multi-position interface comprises a body and the plurality of engagement interfaces each comprise a slot formed in the body, and wherein the engagement element is configured to selectively move into and out of the slots in the body of the multi-position interface.

Embodiment 3. The handle assembly of any one or more of the embodiments, wherein the engagement element is operatively coupled to the user engageable interface through one or more connective members extending along the at least one elongated member.

Embodiment 4. The handle assembly of any one or more of the embodiments, wherein the engagement element is configured to translate in a generally linear direction when moving into and out of engagement with the plurality of engagement interfaces of the multi-position interface.

Embodiment 5. The handle assembly of any one or more of the embodiments, wherein the user engageable interface is configured to selectively move the engagement element into and out of engagement with the plurality of engagement interfaces through linear translation, rotational movement, or both.

Embodiment 6. The handle assembly of any one or more of the embodiments, further comprising a biasing element configured to bias the engagement element into at least one of the plurality of engagement interfaces.

Embodiment 7. The handle assembly of any one or more of the embodiments, wherein the multi-position interface is disposed between the biasing element and the handle member.

Embodiment 8. The handle assembly of any one or more of the embodiments, wherein the handle is pivotable around a pivot, and wherein the multi-position interface is disposed between the pivot and the handle member.

Embodiment 9. The handle assembly of any one or more of the embodiments, wherein the power tool comprises a lawn mower, and wherein the at least one elongated member comprises two elongated members, the two elongated members disposed on opposite sides of a blade assembly of the lawn mower.

Embodiment 10. A handle assembly for a power tool, the handle assembly comprising: a multi-position interface coupled to a work portion of the power tool; a user engageable interface coupled to a handle of the power tool; and an engagement element coupled to the user engageable interface and selectively adjustable between a plurality of slots disposed in the multi-position interface, the engagement element being spring biased into the slots and linearly displaceable from the slots upon actuation of the user engageable interface.

Embodiment 11. The handle assembly of any one or more of the embodiments, further comprising one or more connective members directly coupled between the user engageable interface and the engagement element, the one or more connective members extending between the work portion of the power tool and a handle member of the handle portion of the power tool.

Embodiment 12. The handle assembly of any one or more of the embodiments, wherein at least one of the slots defines a shape configured to have a close fit with the engagement element.

Embodiment 13. The handle assembly of any one or more of the embodiments, wherein the handle is rotatable relative to the work portion of the power tool when the engagement element is displaced from the plurality of slots in the multi-position interface.

Embodiment 14. The handle assembly of any one or more of the embodiments, wherein the power tool comprises a lawn mower.

Embodiment 15. A method of adjusting a handle assembly of a power tool, the method comprising: actuating a user engageable interface so as to move an engagement element relative to a first engagement interface of a multi-position interface; adjusting the angular orientation of the handle assembly after the engagement element is clear of the first engagement interface; and actuating the user engageable interface so as to move the engagement element to the multi-position interface at a second engagement interface of the multi-position interface.

Embodiment 16. The method of any one or more of the embodiments, wherein actuating the user engageable interface comprises at least one of linearly translating the user engageable interface and rotating the user engageable interface.

Embodiment 17. The method of any one or more of the embodiments, wherein actuating the user engageable interface causes one or more connective members extending between the user engageable interface relative and the engagement element to pull the engagement element from the first engagement interface.

Embodiment 18. The method of any one or more of the embodiments, wherein actuating the user engageable interface is performed so as to linearly translate the engagement element from the first engagement interface, the first engagement interface comprising a slot in which the engagement element can be selectively disposed within.

Embodiment 19. The method of any one or more of the embodiments, wherein adjusting the angular orientation of the handle assembly is performed by rotating the handle assembly about a pivot, the pivot being disposed between the multi-position interface and a work portion of the power tool.

Embodiment 20. The method of any one or more of the embodiments, wherein releasing the user engageable interface causes a biasing element to bias the engagement element toward the multi-position interface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A handle assembly for a power tool, the handle assembly comprising:
   a bushing coupled to a work portion of the power tool;
   a handle extending from the bushing, the handle comprising:
      a handle member configured to be engaged by a user when operating the power tool; and
      at least one elongated member extending between the handle member and the bushing,
      wherein the handle is rotatable relative to the work portion about a pivot axis defined by the bushing;
   a multi-position interface spaced apart from the handle member, the multi-position interface defining a plurality of engagement interfaces;
   an engagement element configured to move relative to the multi-position interface and be selectively engageable with the plurality of engagement interfaces;
   a user engageable interface disposed at or adjacent to the handle member and configured to selectively move the engagement element into and out of engagement with the plurality of engagement interfaces of the multi-position interface;
   a biasing element configured to pull the engagement element into at least one of the plurality of engagement interfaces, wherein the biasing element is coupled to the engagement element and the bushing such that the bushing is disposed between a portion of the biasing element and the engagement element; and
   a kill switch disposed at the handle, wherein the kill switch is separate from the user engageable interface, and wherein depressing the kill switch permits operation of the power tool;
   wherein the handle assembly is angularly repositionable between a plurality of angular orientations when the engagement element is not disposed within any of the plurality of engagement interfaces, and wherein the handle assembly is angularly fixed to the work portion of the power tool when the engagement element is disposed within one or more of the plurality of engagement interfaces.

2. The handle assembly of claim 1, wherein the multi-position interface comprises a body and the plurality of engagement interfaces each comprise a slot formed in the body, and wherein the engagement element is configured to selectively move into and out of the slots in the body of the multi-position interface.

3. The handle assembly of claim 1, wherein the engagement element is operatively coupled to the user engageable interface through one or more connective members extending along the at least one elongated member.

4. The handle assembly of claim 1, wherein the engagement element is configured to translate in a generally linear direction when moving into and out of engagement with the plurality of engagement interfaces of the multi-position interface.

5. The handle assembly of claim 1, wherein the user engageable interface is configured to selectively move the engagement element into and out of engagement with the plurality of engagement interfaces through linear translation, rotational movement, or both.

6. The handle assembly of claim 1, wherein the biasing element comprises a spring that extends across the pivot axis.

7. The handle assembly of claim 1, wherein the engagement element has a wedge shape.

8. The handle assembly of claim 1, wherein the at least one elongated member comprises two elongated members each having one engagement element configured to interface with a different multi-position interface.

9. The handle assembly of claim 1, wherein the power tool comprises a lawn mower, and wherein the at least one elongated member comprises two elongated members, the two elongated members disposed on opposite sides of a blade assembly of the lawn mower.

10. A handle assembly for a power tool, the handle assembly comprising:
   a bushing configured to be coupled to a work portion of the power tool;
   a handle extending from the bushing, wherein the handle is rotatable relative to the work portion about a pivot axis defined by the bushing;
   a multi-position interface defining a plurality of engagement interfaces;
   a user engageable interface coupled to a handle of the power tool;
   a kill switch attached to the handle assembly, wherein the kill switch is separate from the user engageable interface, and wherein depressing the kill switch permits operation of the power tool;

an engagement element coupled to the user engageable interface and selectively adjustable between the plurality of engagement interfaces disposed in the multi-position interface, the engagement element being linearly displaceable from the engagement interfaces upon actuation of the user engageable interface; and a biasing element configured to pull the engagement element into at least one of the plurality of engagement interfaces, wherein the biasing element passes over the pivot axis.

11. The handle assembly of claim 10, further comprising one or more connective members directly coupled between the user engageable interface and the engagement element.

12. The handle assembly of claim 10, wherein at least one of the engagement interfaces defines a shape configured to have a close fit with the engagement element.

13. The handle assembly of claim 10, wherein the handle is rotatable relative to the work portion of the power tool when the engagement element is displaced from the plurality of engagement interfaces in the multi-position interface.

14. The handle assembly of claim 10, wherein the kill switch is configured to translate linearly from a first position to a second position to disengage the work portion from power.

15. A method of adjusting a handle assembly of a power tool, the method comprising:
actuating a user engageable interface at a handle of a power tool to remove an engagement element from a first engagement interface of a multi-position interface;
adjusting an angular orientation of the handle assembly relative to a work portion of the power tool after the engagement element is clear of the first engagement interface by rotating the handle assembly about a bushing coupled to the work portion;
actuating the user engageable interface so as to move the engagement element to the multi-position interface at a second engagement interface of the multi-position interface, wherein the engagement element is pulled into the second engagement interface by a biasing element, and wherein the biasing element is coupled to the engagement element and the bushing such that the bushing is disposed between a portion of the biasing element and the engagement element; and
depressing a kill switch to deliver power to a work portion of the power tool.

16. The method of claim 15, wherein actuating the user engageable interface comprises at least one of linearly translating the user engageable interface and rotating the user engageable interface.

17. The method of claim 15, wherein actuating the user engageable interface causes one or more connective members extending between the user engageable interface relative and the engagement element to pull the engagement element from the first engagement interface.

18. The method of claim 15, wherein actuating the user engageable interface is performed so as to linearly translate the engagement element from the first engagement interface, the first engagement interface comprising a slot in which the engagement element can be selectively disposed within.

19. The method of claim 15, wherein the bushing defines a pivot axis, and wherein the biasing element extends across the pivot axis.

20. The method of claim 15, wherein the engagement element has a wedge shape.

\* \* \* \* \*